United States Patent
Abdalla et al.

(10) Patent No.: US 7,369,135 B2
(45) Date of Patent: May 6, 2008

(54) MEMORY MANAGEMENT SYSTEM HAVING A FORWARD PROGRESS BIT

(75) Inventors: Karim M. Abdalla, Menlo Park, CA (US); Robert C. Keller, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 600 days.

(21) Appl. No.: 10/976,978

(22) Filed: Oct. 29, 2004

(65) Prior Publication Data

US 2006/0092165 A1  May 4, 2006

(51) Int. Cl.
*G09G 5/36* (2006.01)

(52) U.S. Cl. .................. 345/545; 707/201; 707/202; 707/203; 711/219; 711/156; 711/157; 711/158

(58) Field of Classification Search ........ 345/545–570; 711/139
See application file for complete search history.

(56) References Cited

U.S. PATENT DOCUMENTS 6,105,051 A    8/2000  Borkenhagen et al.

2003/0233394 A1* 12/2003 Rudd et al. ................ 709/107

FOREIGN PATENT DOCUMENTS

EP    1450257    8/2004

OTHER PUBLICATIONS

International Search Report, Feb. 14, 2004.
"Sheduling Process Swapping Based on Repaging Rate" IBM Technical Disclosure Bulletin, vol. 34, No. 8 Jan. 1992 pp. 127-129.

* cited by examiner

*Primary Examiner*—Xiao Wu
*Assistant Examiner*—Joseph Barnes
(74) *Attorney, Agent, or Firm*—Patterson & Sheridan, L.L.P.

(57) ABSTRACT

A virtual memory system that maintains a list of pages that are required to be resident in a frame buffer to guarantee the eventual forward progress of a graphics application context running on a graphics system composed of multiple clients. Pages that are required to be in the frame buffer memory are never swapped out of that memory. The required page list can be dynamically sized or fixed sized. A tag file is used to prevent page swapping of a page from the frame buffer that is required to make forward progress. A forward progress indicator signifies that a page faulting client has made forward progress on behalf of a context. The presence of a forward progress indicator is used to clear the tag file, thus enabling page swapping of the previously tagged pages from the frame buffer memory.

16 Claims, 4 Drawing Sheets

MEMORY MANAGEMENT SYSTEM HAVING A FORWARD PROGRESS BIT

BACKGROUND OF THE INVENTION

1. Field of the Invention

This invention relates to memory management systems suitable for use with graphic systems. More particularly, this invention relates to using forward progress information to manage physical page memory to ensure that graphic system memory clients make forward progress.

2. Description of the Related Art

Computer systems invariably include memory. In fact, most computer system have many different types and classes of memories, e.g., main memory, cache memory, read-only memory, random access memory, hard disk memory, flash memory, and so on. However, a simple reference to computer memory usually refers to the main memory that stores the program instructions that a processor executes as well as the data that those instructions use and produce.

The amount and type of main memory is very important to overall system performance. Main memory systems can be and usually are comprised of both dynamic random access memory (DRAM) and disk memory. DRAM is very fast; data reads and writes often occur in times measured in nanoseconds. Unfortunately, while fast, DRAM is also relatively expensive. That expense tends to limit the amount of DRAM that is available. To augment their DRAM, modern computers incorporate disk memory into their main memory systems. Disk memory is very slow when compared to DRAM, having read and write times measured in milliseconds. Beneficially however, disk memory is much cheaper than DRAM. While what follows often discusses disk memory, primarily because disk memory is so common, in practice when disk memory is used it should be understood that other types of memory, for example, "ram disk" memory also can be used. It should also be understood that in the context of discussing virtual memory systems, the term "physical memory" applies to the system's DRAM.

The need to integrate both physical memory and disk memory to form the illusion of an integrated main memory has lead to the development of virtual memory systems and virtual memory managers. A virtual memory manager can enable an application (computer program) running on a computer system to be able to uniformly access far more memory than the computer actually has in physical memory. The application is said to access "virtual memory" whose underlying storage is actually made up of a combination of physical and disk memory, which is managed behind the scenes (from the point of view of the software application) by the virtual memory manager.

Most virtual memory managers use the concept of pages. Programs and their associated data are stored in pages, with the frequently used pages being kept available in physical memory. Less often used pages are stored in disk memory. When a page that is not in physical memory is required by the software application, the operating system/virtual memory manager asserts a page fault exception. When a page fault exception occurs the virtual memory manager causes a requested page that is in disk memory to be inserted into physical memory and the displaced page in physical memory is moved to disk memory to make room for the incoming page. This process is called page swapping.

Virtual memory systems and virtual memory managers are implemented using a combination of hardware mechanisms and operating system software mechanisms. For performance efficiency, virtual memory systems are usually implemented in such a way that when a virtual memory access by an application would result in a physical memory access without requiring any page swap, the requisite physical access would normally be made entirely using hardware mechanisms that are much faster than software.

The page replacement algorithm, also referred to as the page manager, of the manager component of the virtual memory subsystem is responsible for deciding which page to evict from physical memory and write back to disk in order to make space for the requested page. The page manager is also responsible for initiating the associated transfers between DRAM and disk. The page manager updates various tables that the hardware and software use to keep track of the mapping between virtual pages and DRAM or disk pages. Because the page manager is usually implemented in software and because it can afford to take some time to make a decision, the page manager can use relatively sophisticated algorithms to decide which page's eviction is likely to be least detrimental to system performance.

Virtual memory systems are very useful since they allow a computer to run software applications (or programs) that require more memory than the available physical memory, while not burdening the software application (or its programmer) with any knowledge of the underlying composition of the storage that the program is running on (or will run on). Furthermore, virtual memory allows each computer program to run in a private virtual memory context, which gives a program the illusion that it can use the same virtual memory address range each time that it runs, even if other programs (or other instances of the same program) are running (or will run) on the system concurrently with that program. This per-program instance of a virtual memory context enables modern multitasking such as running a word processor, a graphics program, a spreadsheet, and a database all at the same time, and without requiring any one of those program to have knowledge that there may be other programs running concurrently.

While highly beneficial, virtual memory systems are not without problems. If a computer system has insufficient physical memory, the virtual memory manager can cause constant (or almost constant) page swapping, a condition called thrashing, which leads to poor system performance. However, this problem is generally well understood and is typically addressed by incorporating sufficient physical memory to prevent or to reduce thrashing to an acceptable level.

While prior art computer systems have benefited from virtual memory and virtual memory managers, the prior art approach to virtual memory management may be insufficient to handle the memory requirements of modern and future graphics processing units (GPUs). Over recent years graphics processing has developed into extremely high speed, parallel processing systems composed of multiple memory clients that can perform mathematical and related operations on very large amounts of data that must be read from and/or written to the GPU's main memory. It should be noted that traditionally (i.e., in GPUs that do not implement virtual memory), a GPU's main memory is often referred to as the "frame buffer."

In graphics terminology, a "memory client" is a hardware entity within the GPU that can process data that is stored in the GPU's main memory to achieve a desired result. For example, a graphical processing device produced by the assignee of the present invention includes multiple shader pipelines, each having multiple processing stations (such as texture stations), and each of which can be individually programmed to process segments of data. Each pipeline's texture station would be a memory client because it reads and operates on texture data stored in the GPU's main memory to achieve a desired result for which the pipeline is programmed. Other clients can include raster operation processors, rasterizers, geometry engines, etc.

Graphic processing programs can be divided up into groups of specific tasks that are to be accomplished. Those tasks are referred to herein as contexts. A context itself can be divided into threads, with a thread being a portion of the context that can be "completed." That is a thread produces a given result that can then be used by other threads. In doing so a thread "retires data" in that the data is no longer required by the thread.

A challenge presented by modern graphical systems is ensuring that each memory client has the information (program and data) required to perform its assigned tasks. As the number of clients increases and as the amount of data each client can process increases it becomes very important, and more difficult, to ensure that all clients are actually making progress. Page swapping, while beneficial, cannot by itself ensure that multiple clients make progress.

The underlying problem is that the multiple memory clients may be competing against each other for the same physical memory. The problem is further exacerbated by the fact that all the clients may need to work cooperatively, requiring certain pages from each clients to be concurrently present in physical memory in order to finish processing some work before encountering another page fault. For example, if one client needs four pages to make progress, but one page is missing, another client might need several additional pages. Then, one of the four required pages for the first client might be swapped out of physical memory into disk memory to make room for a page required by the second client. Because of other clients causing page swaps the first client may never have access to all of the pages it needs to make progress. Likewise, the other clients may never have access to all of the pages they need to make progress. The result is excessive thrashing and possibly a frozen graphics system.

Therefore, a method of ensuring that required pages are available such that the graphical system makes progress would be beneficial. Also beneficial would be a simple hardware mechanism that can be used to ensure that forward progress is or will be made.

SUMMARY OF THE INVENTION

The principles of the present invention generally relate to a technique for providing a virtual memory system and, in particular, a page manager with sufficient information to maintain a list of pages that are required to be resident in a frame buffer (a physical memory) to guarantee the eventual forward progress of a graphics context running on a graphics system that is composed of multiple memory clients. By "graphics context" it is meant a given running instance of a graphics application such as a computer game. Beneficially the required page list is dynamically sized, although a fixed-size required page list can be used. At least some of the pages in the required page list can be tagged such that page swapping of a tagged required page is prohibited.

Beneficially the memory system operates by having clients selectively attach a forward progress bit to page fault exceptions. The presence of a forward progress bit signifies that the page faulting client has made forward progress since the previous time the client encountered a page fault for the same context being run, while the absence of a forward progress bit signifies that the page faulting client has not made forward progress since its previous fault for that context. The presence of a forward progress bit is used to clear the tags, thus enabling page swapping of the previously tagged pages from the frame buffer memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
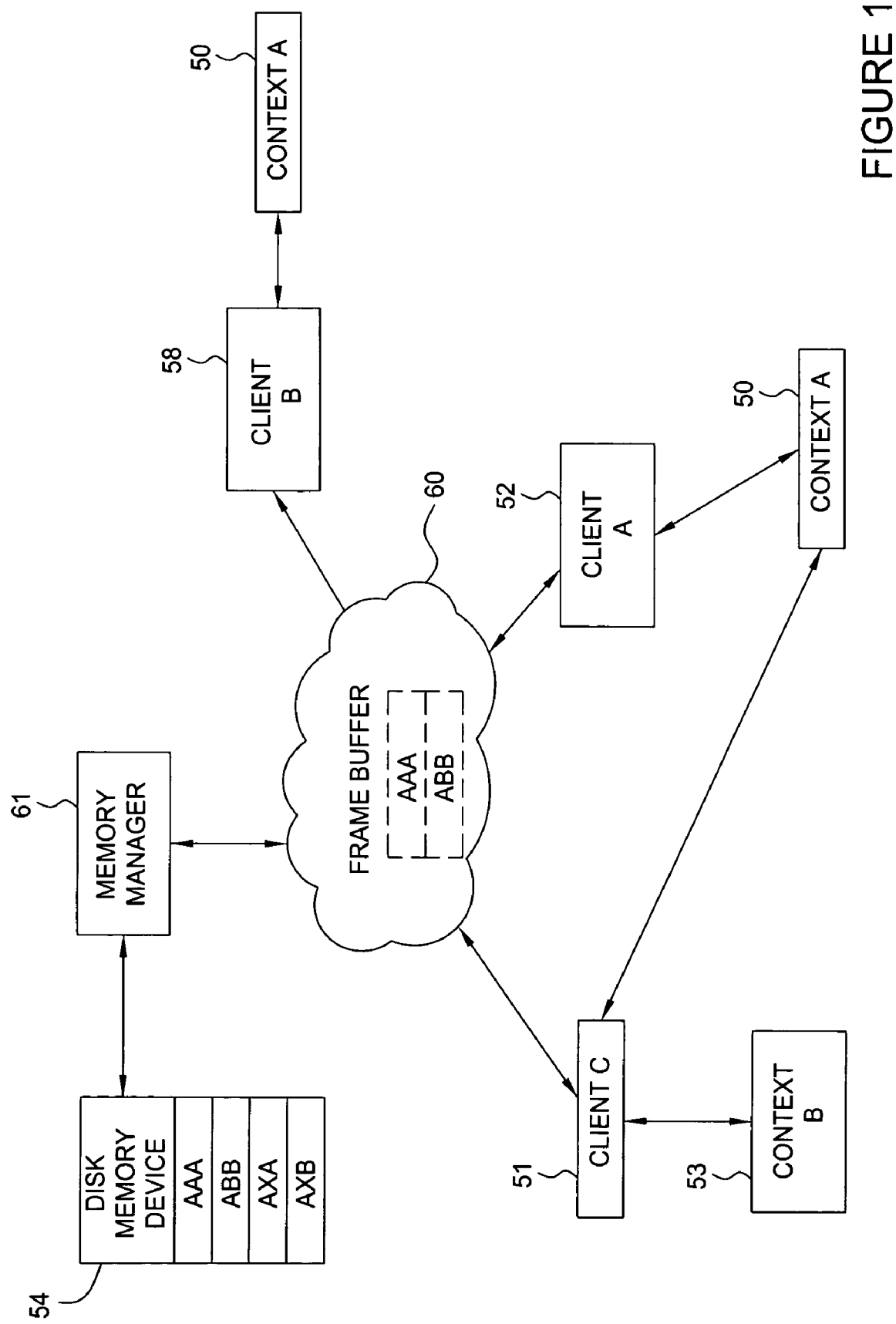
FIG. 1 illustrates an overview of a problem being addressed by the principles of the present invention.

The principles of the present invention provide for methods and systems that address problems related to managing virtual memory in computer systems that have GPUs composed of multiple memory clients (thereafter, just "clients"). FIG. 1 is useful for illustrating the problems address by the present invention. In multiple client systems, to avoid wasting time by idling the GPU during the relatively slow disk transfers of a page swap from a disk memory into a frame buffer, if a context A 50 (a program or program segment being performed) is being processed by clients A 52 and B 56, and if client A encounters a page fault accessing virtual page AAA, which is in disk memory 54, the GPU (not shown) automatically performs a context switch to allow context A 50 to be run by client B 58 (or client C 51 to run context B 53, etc) while the faulted page gets swapped from disk memory 54 to a frame buffer memory 60 by a memory manager 61. After page AAA is resident in the frame buffer memory 60, context A 52 will, in its proper turn, be free to attempt to make forward progress on the job it was performing for context A 50. After page AAA is swapped in and context A is restored to the running state, client A 50 will performs its tasks for a while until client B 58 is given an opportunity (say by a time-out) to service context A 50. Client A 52 very well may not be done with its tasks, and Client B may find that it needs another virtual page ABB, and another page fault exception occurs to obtain ABB.

For context A to continue making forward progress client A still needs page AAA while client B needs page ABB. Both pages must be available for context A to move forward. But, if page AAA is evicted (swapped out) to disk memory 54 to make room in the frame buffer 60 for page ABB, client A will cause another page fault it attempts to service context A. So, if the system re-acquires page AAA from the disk memory 54 but causes page ABB to be swapped out to disk memory 54 to make room for page AAA, client B takes over and finds page ABB is missing and asserts another page fault. This cycle can continue numerous times. Remembering that other clients can be running other contexts (or the same context) the chances of one page fault causing an eviction of a page required by another client increase. The overall system performance could be slowed down or even stopped as page faults cause future page faults.

Note that a similar problem could exist even if the GPU contained only a single client X, which needed both pages AXA and AXB to be simultaneously resident in order to allow context A to make progress. The presence of multiple clients just makes the problem more complicated since it allows for the possibility of multiple page faults being encountered simultaneously. Multiple clients in a GPU can mean that some threads of a context make forward progress while running on some clients, while other threads of the same context do not make forward progress running on other clients. But, such a case still constitutes overall forward progress for the context.

The principles of the present invention can ensure that all required pages (page AAA and page ABB in our main example) of a context (context A in our example) will eventually be resident in physical memory simultaneously, while also allowing non-required pages to be evicted. The underlying principle of the invention is to convey to a page replacement algorithm of a page manager that is being run by a central processing unit essential information about what pages of a context need to be (or don't need to be) simultaneously resident in physical memory (and hence which pages should or should not be selected for eviction by subsequent page faults) to guarantee that the context eventually makes forward progress. The information conveyed can also give knowledge to the page manager if forward progress is simply not possible because there are more simultaneously required pages than there are physical pages in the system. This knowledge allows for a more graceful handling of such a case by the central processing unit.

Furthermore, the principles of the present invention reduce thrashing by allowing the page manager to make better page replacement decisions. This increases system performance for a given amount of physical memory, especially if physical memory is relatively scarce to begin with. This benefit could also be translated to building a cheaper system with less physical memory that has the same performance as a system without the invention.

Figure 2:
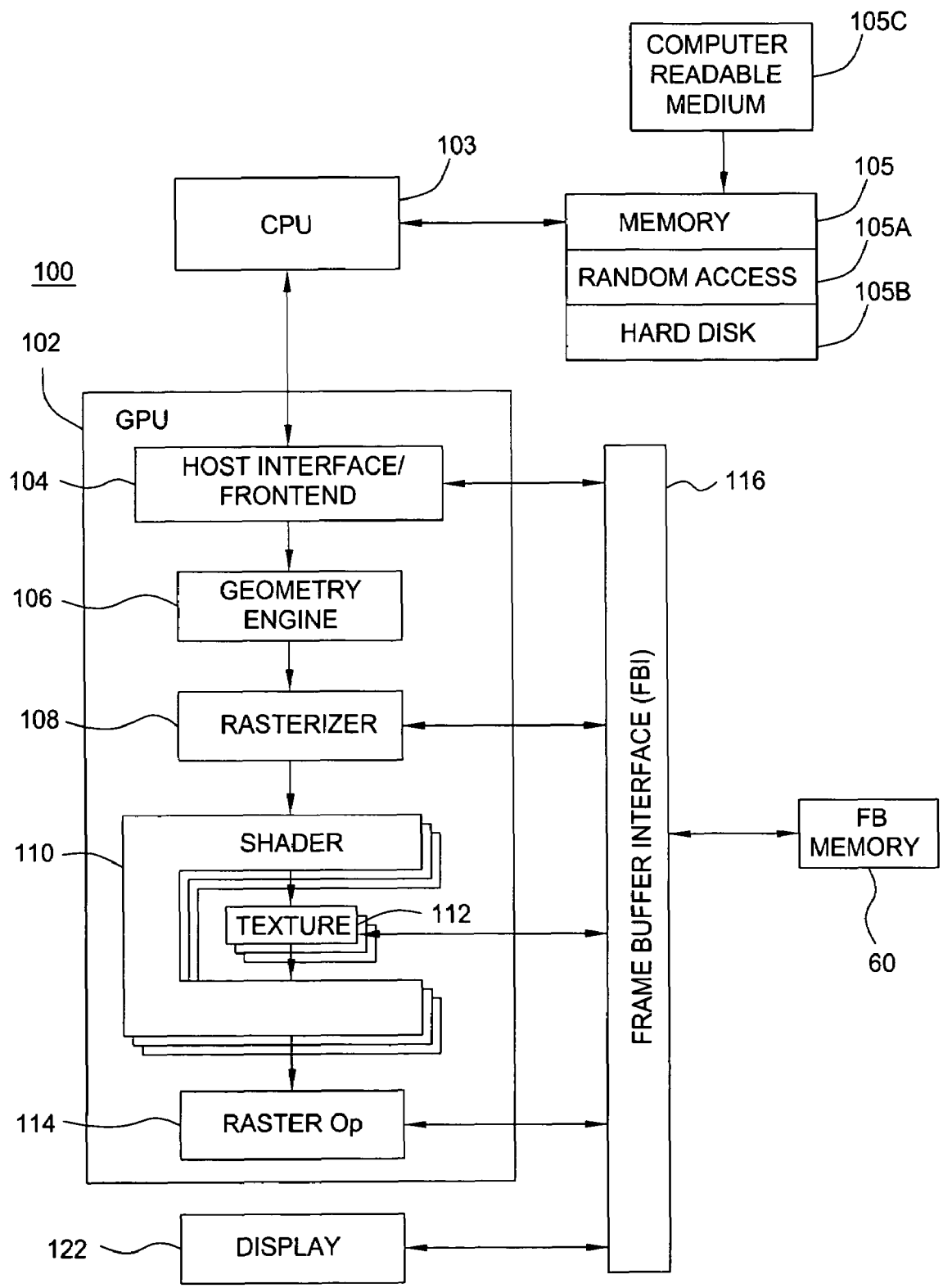
FIG. 2 illustrates a computer system having a graphics processing unit with multiple clients and that implements the principles of the present invention.

FIG. 2 illustrates a computer system 100 having a graphics processing unit 102 with multiple clients that interacts with a central processing unit 103. The central processing unit 103 is running an operating system and an application program, or is multitasking between multiple application programs that are stored in a memory system 105. The memory system 105 includes both a physical memory 105A, i.e., the frame buffer 60, and a hard disk 105B, i.e., the disk memory 54. An application program is a graphic program that makes use of various clients within the graphics processing unit 102. The operating system and the application program can be input from a computer readable medium 105C. The computer readable medium 105C includes program instructions that the central processing unit 103 follows to implement the principles of the present invention.

The graphics processing unit 102 includes a host interface/front end (hereinafter host interface 104) that receives raw graphics data from the central processing unit 103. The host interface 104 buffers input information and supplies raw graphic information to a geometry engine 106. The geometry engine has access to a frame buffer memory 60 via a frame buffer interface 116. The geometry engine 106 produces, scales, rotates, and projects three-dimensional vertices of graphics primitives in "model" coordinates that are stored in the frame buffer memory 60 into two-dimensional frame-buffer co-ordinates. Typically, triangles are used as graphics primitives for three-dimensional objects, but rectangles are often used for 2-dimensional objects (such as text displays). It should be understood that the frame buffer memory 60 can be either a memory dedicated to the graphics system or part of the system memory.

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader 110 that processes input data (code, position, texture, conditions, constants, etc) using a shader program (sequence of instructions) to generate output data. Shaders can be considered as a collection of processing capabilities that can handle large amounts of data at the same time, such as by parallel processing data.

The shader 110 includes a texture engine 112 that modifies the rasterized pixel data to have the desired texture and optical features. The texture engine 112, which has access to the data stored in the frame buffer memory 60, can be implemented using a hardware pipeline that processes large amounts of data at very high speed. The shaded pixel data is then sent to a Raster Operations Processor 114 (Raster op in FIG. 2 that optionally performs additional processing on the shaded pixel data. The result is pixel data that is stored in the frame buffer memory 60 by the frame buffer interface 116. The frame pixel data can be used for various processes such as being displayed on a display 122.

As shown in FIG. 2 various stations have access to the frame buffer memory 60, for example, the host interface 104, the rasterizer 108, the texture station 112, and the Raster Operations Processor 114. In fact, the shader 110 includes multiple texture stations, each having access to the frame buffer memory 60. All of those stations that have access to the frame buffer memory process data to achieve desired results and are therefore clients.

Figure 3:
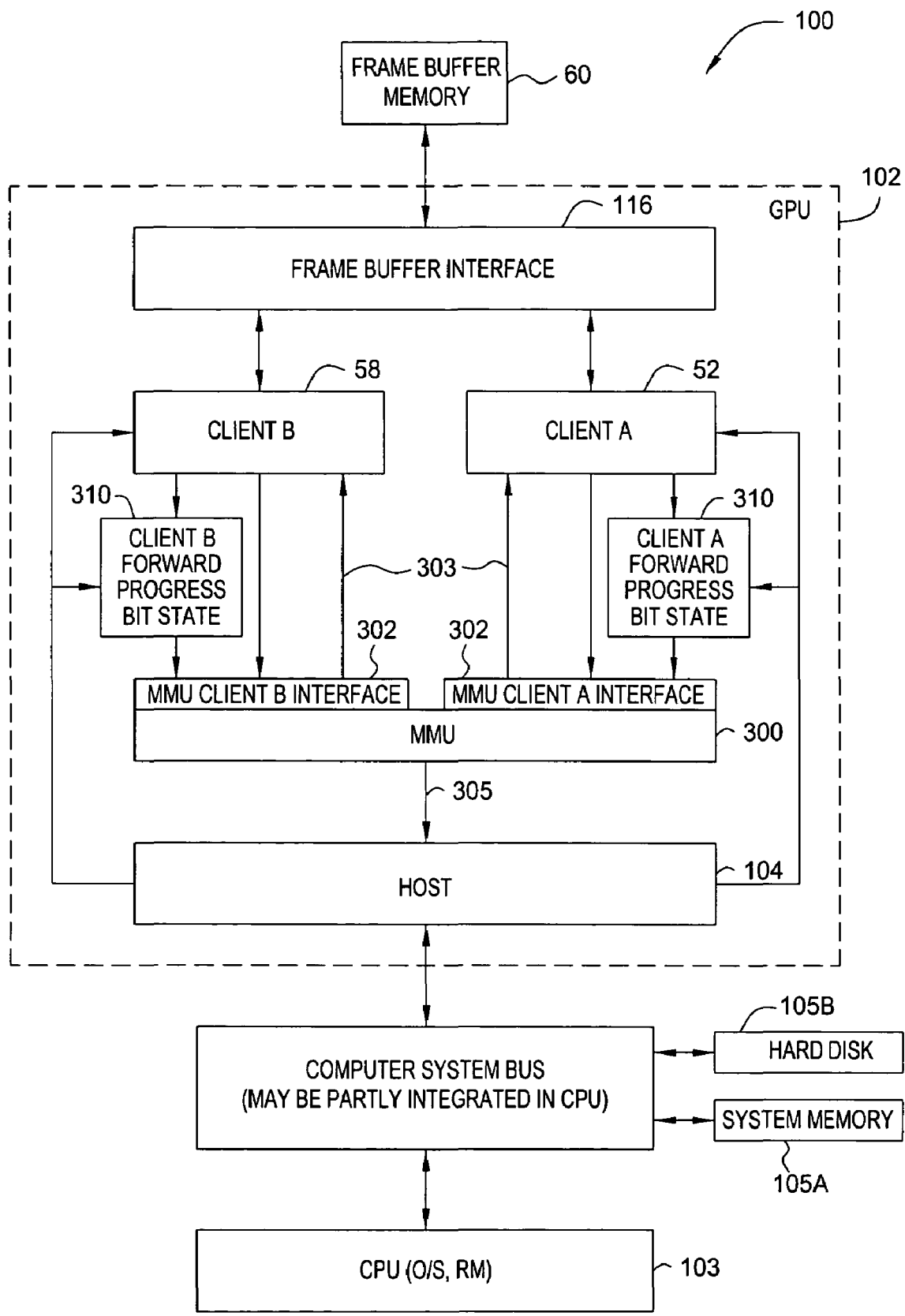
FIG. 3 illustrates the relationship between the frame buffer memory content, a required page list, and a tag list.

While FIG. 1 helps illustrate a problem being addressed by the present invention, and while FIG. 2 illustrates a computer system that is suitable for implementing the principles of the present invention, FIG. 3 helps explain how the principles of the present invention are implemented in the computer 100. The GPU 102 is shown with a memory management unit, herein after MMU 300 that handles memory management tasks for client A 52, for client B 58, and for the other clients of the computer system 100, and there may be many, that are not shown for clarity. The clients themselves do not know how pages are made available to them from the frame buffer memory 60. The clients simply interact with the MMU 300 via client interfaces 302. For example, the client A 52 might request page AAA. In response to that request the computer 100 processes the requests in a manner, described below, that ensures that the requested page AAA is, or will be, in the frame buffer memory 60.

FIG. 3 shows two clients and their supporting busses, lines, and memory devices 310. Other clients will have similar support. To load a context into a client, say context A into client A 52 the host interface 104 obtains the context (say from the CPU 103) and programs the client A 52 with the context A. Client A 52 then processes data in accord with context A and it will be assumed eventually sends a request for a page of information to the MMU 300 using a virtual address. The MMU 300 parses the virtual address to determine if the requested page is or is not available in the frame buffer memory 60. If there is no page fault, meaning that the requested information is available in the frame buffer memory 60, the MMU 300 does not assert a page fault on a line 303 and the client A obtains the requested page from the frame buffer memory 60 via the frame buffer interface 116. If client A has made any forward progress with performing context A the client A sets its memory device 310, e.g., a flip-flop, to produce a forward progress bit that is input to the MMU 300 via its interface 302.

Forward progress refers to retiring some page of data that is used in the process being performed such that the page of data is no longer be required by the thread of the context being run. However, the page of data may be required for another thread, but that does not impact on whether forward progress has been made.

However, if the page requested by client A, say page AAA, is not in the frame buffer memory 60 the MMU 300 sends a page fault to the client A 52 on line 303 that causes client A to stop processing context A. The MMU 300 also interrogates the state of the forward progress bit and sends the host interface 104 via a bus 305 both a page exception requesting page AAA and an indication as to whether the page exception-initiating client (client A in this case) has reported forward progress. The host interface 104 sends the virtual address of the missing page (page AAA) to the central processing unit 103. Furthermore, the host interface 104 also sends a forward progress bit to the central processing unit 103 if, and only if, client A reported forward progress.

Figure 4:
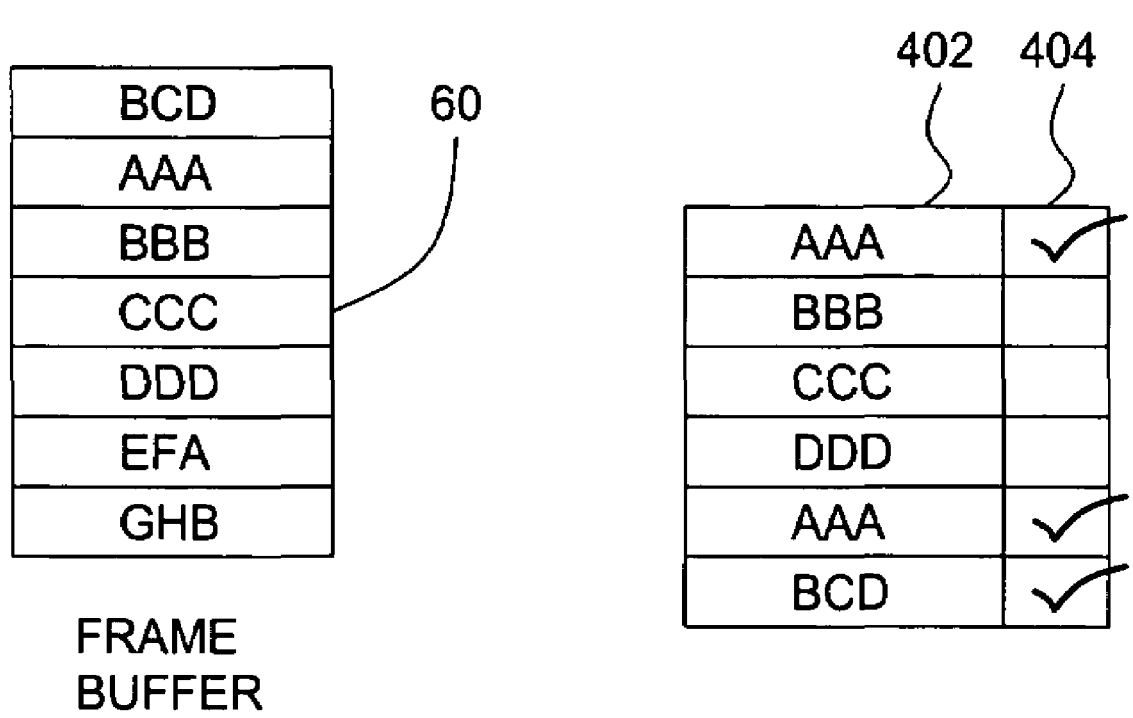
FIG. 4 illustrates interactions of multiple clients within a virtual memory system, including interactions between a memory management unit (MMU), a host interface, and the CPU when a required page is not in the frame buffer memory.

If the central processing unit 103 receives the page fault virtual address, but does not receive a forward progress bit, the central processing unit 103 interrogates the frame buffer memory 60 to determine which pages are available for swapping. However, in accord with the principles of the present invention the central processing unit 103 does this in a particular way. When a client causes a page fault exception because that client, say client A 52, needs a page, say page AAA (see FIG. 1), but that client does not report forward progress, the central processing unit 103 adds page AAA to a page list 402, see FIG. 4. Furthermore, since page AAA must be in the frame buffer memory 60 for client A 52 to make forward progress, page AAA is tagged as a required page using an associated tag list 404. Servicing the page fault exception is then performed by swapping one of the pages that is not required, that is, does not have an accompanying tag in the tag list 404, say page GHB, from the frame buffer memory 60 to the disk drive 105B to make room for page AAA.

It should be noted that the page list 402 contains only a listing of the pages in the frame buffer memory 60, not the data itself. It also should be noted that only the pages having a tag in the tag list 404 must remain in the frame buffer memory 60. All other pages may be swapped out to make room for a required page. It is the task of the central processing unit 103 to check the tag list 404 and to ensure that all tagged pages are kept in the frame buffer memory.

The foregoing has focused on maintaining the tag list 404. However, in response to the page exception the central processing unit 103 also sends the host interface 104 a context for another client, say the client B 58. This avoids wasting time idling the GPU 102 waiting on the disk access that is required to service the page fault. The client B 58 is programmed via the host interface 104 with the context (which could be context A) and is enabled by to run while the requested page AAA is being made available in the frame buffer memory 60. If there are no other contexts that need to run, then the GPU may be allowed to go relatively idle. In addition, the host interface 104 clears the memory device 310 for client B 58. If client B reports any forward progress the state of the memory device 310 is changed to inform the MMU 300 that forward progress was reported. For now it will be assumed that client B causes a page fault exception because another page, say page BCD is not available, but also does not report forward progress. The foregoing actions with respect to client A are then repeated.

As more clients cause page fault exceptions without reporting forward progress the number of tagged pages in the tag list 404 increases. For example, when client B 58 causes a page fault exception because its requested page BCD is not available and also does not report forward progress page list 402 and the tag list 404 grow. This process is repeated until one client causes a page fault exception but reports forward progress. That is, a client finds all of the data it needs before encountering a page faults to make forward progress. In that case the host interface 104 attaches a forward progress bit to the page fault exception.

Upon the occurrence of a page fault accompanied by a forward progress bit the central processing unit 103 clears all of the tags in the tag list 404. This enables any page in the frame buffer (except the one that generated the page fault exception) to be swapped out.

The foregoing has discussed a forward progress bit. In general a forward progress bit can be replaced by any signal that notifies the system whether forward progress has been made by a client that causes a page fault. Such signals can be a special bit, the setting or clearing of a flag, a word or a special code, or similar such signals. It is the reporting of forward progress (or no forward progress) that is important. However, for clarity what follows will continue to refer to a forward progress bit.

When a page fault exception has not occurred the central processing unit 103 controls the time that each client has to run its context. After the allotted time has passed the central processing unit 103 causes the host interface 104 to have another client run a context. This allows multiple contexts to be run, or one context to be run by multiple clients, in an interlaced fashion.

Knowing if a client has made forward progress is important because it means that at least one client had sufficient information in the frame buffer 60 to actually retire some set of data such that the context does not have to process that set of data again using the current programming instructions. Essentially, forward progress means that some work has been completed and thus never has to be repeated because it got discarded due to a page fault during the execution of said work.

According to an embodiment of the present invention, if a client, say client A 52 has made forward progress when that client causes a page fault exception and attaches a forward progress bit the central processing unit 103 knows that the most recently running context made forward progress before triggering the page fault. However, if the client has not made forward progress the central processing unit 103 knows that no forward progress was made. Without even knowing which client reported forward progress on which particular context the central processing unit 103 knows that at least one thread of a context made forward progress. That knowledge is not only sufficient to guarantee that forward progress is made for that thread, but propagation of forward progress bits through the system can be used to ensure that forward progress is eventually achieved overall.

Implicit in the foregoing is an assumption is that if other threads (for example to texture a different pixel) of a context that is running on multiple clients keep making forward progress while occasionally encountering page faults (thus clearing the required page list) that a client that is running a particularly unlucky thread that is not able to make forward progress that the unlucky thread will eventually become an unsatisfied dependency that prevents launching any new threads of the context. This causes the unlucky thread to become the only thread that can run for that context. Such a thread is called a critical thread. The pages in the lists 402 and 404 required to be kept for the context will eventually be whittled down to just the pages required to allow the critical thread to make forward progress. The pages of completed threads not required for the critical thread will have been marked free. This means that the system will eventually and automatically dedicate as many physical pages as necessary to allow the critical thread to make forward progress, while not wasting any physical pages on pages not needed to for that critical thread to make progress.

If there are several completely independent threads running on independent subsystems in the GPU, the foregoing method can be modified to have the client label each request (and possible each resultant page fault) with a subsystem identifier. Then, the page manager would add to the required page list a per subsystem identifier. In that scenario the operating system would become responsible for keeping the required pages available for each subsystem in order to guarantee that each subsystem can make progress. The use of subsystem identifier by the operating system to keep an effectively per-subsystem required page list in order to ensure that each subsystem makes forward progress is analogous to it keeping an effectively per-context required page list in order to make sure that each context makes progress. The main difference is that the subsystem id is provided by the GPU client, whereas the operating system would already know the context id of the running context.

An alternative embodiment of the present invention keeps one page list per context. In such an embodiment, the page replacement algorithm can ensure that each context makes forward progress by only freeing pages that were required for the forward progress of the context that just reported that it had made forward progress. This allows the page manager to guarantee forward progress of each context, instead of just any one context.

A computer system that is in accord with the principles of the present invention uses a forward progress bit, or lack thereof, to guarantee that its running graphics application or multitasked applications can, in fact, all make forward progress when schedule to run on the GPU. An example of the foregoing is when a texture subsystem (which is a virtual memory client within the GPU) needs multiple texels to be able to retire a particular pixel as part of executing the context of a graphics application. If the multiple texels are on different virtual memory pages, multiple page faults might occur during fetches of the multiple virtual memory pages. If all required virtual memory pages are not resident in the frame buffer at the same time, the texture subsystem will never be able to retire that pixel, effectively freezing the graphics application trying to render that pixel. Without some guarantee that all the required pages will be resident at the same time the graphics application cannot be guaranteed to make forward progress.

It is possible to implement the foregoing general scheme using a required page list having a fixed size. For example, the contents of the required page list could change dynamically but the size of the list would not. The CPU 103 can then employ some kind of replacement policy (e.g. last-in first-out) when a new page needs to be added to the list. However, in general, a dynamically changing required page list size avoids the need to either make the fixed size page list large enough to guarantee forward progress in all cases, including pathological worst cases, or to eliminate the pathological worst-case requirement.

While the foregoing has described the principles of the present invention using graphic clients, those principles are broader than that. For example, clients can include software applications and media processing systems, e.g., video and audio systems. Implementing the principles of the present invention may require some adaptation of some operating systems.

While the foregoing is directed to embodiments of the present invention, other and further embodiments of the invention may be devised without departing from the basic scope thereof, and the scope thereof is determined by the claims that follow.

The invention claimed is:

1. A method of operating a computer system running a graphics application context having threads, comprising the steps of:

sending forward progress information to a processor after a client causes a page fault exception because a thread requires a page missing from a frame buffer, wherein the forward progress information specifies whether, immediately prior to the page fault exception, the client made forward progress on behalf of the context;

adding the missing page to a page list stored in a frame buffer;

tagging the missing page as a required page, wherein each tagged page within the page list is required for the client to make forward progress on behalf of the context;

if the forward progress information specifies that, immediately prior to the page fault exception, the client made forward progress on behalf of the context, clearing all tags other than a tag associated with the missing page; and if the forward progress information specifies that, immediately prior to the page fault exception, the client did not make forward progress on behalf of the context, maintaining the tagged pages within the page list in the frame buffer until the client makes forward progress on behalf of the context.

2. The method of claim 1, wherein forward progress information comprises a forward progress bit.

3. The method of claim 1, wherein the page list is dynamically sized.

4. The method of claim 1, wherein page swapping of a page in the frame buffer that is tagged is prohibited.

5. The method of claim 4, wherein one or more pages in the frame buffer having cleared tags are removed from the frame buffer to make room for the missing page.

6. A computer readable medium containing instructions for a processor that controls a computer system running a graphics application context having threads to perform the steps of:

sending forward progress information to a processor after a client causes a page fault exception because a thread requires a page missing from a frame buffer, wherein the forward progress information specifies whether, immediately prior to the page fault exception, the client made forward progress on behalf of the context;

adding the missing page to a page list stored in a frame buffer;

tagging the missing page as a required page, wherein each tagged page within the page list is required for the client to make forward progress on behalf of the context;

if the forward progress information specifies that, immediately prior to the page fault exception, the client made forward progress on behalf of the context, clearing all tags other than a tag associated with the missing page; and if the forward progress information specifies that, immediately prior to the page fault exception, the client did not make forward progress on behalf of the context, maintaining the tagged pages within the page list in the frame buffer until the client makes forward progress on behalf of the context.

7. The computer readable medium of claim 6, wherein sending forward progress information is comprised of sending a forward progress bit.

8. The computer readable medium of claim 6, wherein the page list is dynamically sized.

9. The computer readable medium of claim 6, wherein page swapping of a page in the frame buffer that is tagged is prohibited.

10. The computer readable medium of claim 9, wherein one or more pages in the frame buffer having cleared tags are removed from the frame buffer to make room for the missing page.

11. A computer system having a graphic sub-system with a plurality of clients, comprising:

a frame buffer memory for storing a first plurality of pages of data;

a non-resident memory for storing a second plurality of pages of data;

a plurality of clients for running contexts, wherein each client can access pages of said first plurality of pages of data when servicing a context, and where each client can send a virtual page request;

a memory management unit for receiving virtual page requests, said memory manager further for sending a page fault if the requested page is not a page of said first plurality of pages of data and is thus a missing page, wherein said page fault identifies said missing page;

a plurality of memory devices, each operatively connected to an associated client and to said memory management unit;

a host interface that sends contexts to said plurality of clients, wherein a context includes threads that cause pages of data to be requested, said host controller further for receiving page faults from said memory management unit and for sending missing page information;

a processor for selectively swapping a page of data from said second plurality of pages of data into first plurality of pages of data and for swapping a page of data from said first plurality of pages of data into said second plurality of pages of data, said selective swapping being performed in response to said missing page information, said processor further for supply said host interface with contexts;

wherein when a first client of said plurality of clients makes forward progress on a context thread said first client sets its associated memory device to report forward progress;

wherein when said first client requests a page of data that is not in said frame buffer said memory management unit creates a page fault exception that includes the state of the memory device associated with said first client;

wherein the page fault exception causes said host interface to send missing page information and forward progress information to said processor;

wherein said processor swaps the missing page of data from said second plurality of pages of data into said first plurality of pages of data and a selected page of data from said first plurality of pages of data into said second plurality of pages of data;

wherein the swapped missing page of data is added as a tagged page in a required page list;

wherein each tagged page within the required page list is required for the first client to make forward progress on the context thread;

wherein the tagged pages within the required page list are maintained in the frame buffer until the first client makes forward progress on the context thread;

wherein the selected page of data is not a tagged page in the required page list;

wherein, when forward progress is reported, all of the tags in the required page list, except for the missing page of data, are cleared; and wherein when said first client runs said context again the state of the memory device associated with the first client is reset.

12. The computer system of claim 11 wherein the frame buffer memory is a physical memory.

13. The computer system of claim 11 wherein the graphic sub-system is a graphics processing unit.

14. The computer system of claim 11 wherein the processor further determines a maximum time in which each client of said plurality of clients can run a context.

15. The computer system of claim 11 wherein said processor implements a virtual memory manager.

16. The computer system of claim 11 wherein the page fault exception causes said host controller to switch clients to allow another context thread to run.

* * * * *